(12) United States Patent
Jung et al.

(10) Patent No.: US 10,714,780 B2
(45) Date of Patent: Jul. 14, 2020

(54) SEPARATOR HAVING A PLURALITY OF RIBLET ELEMENTS CONNECTED BY A PLURALITY OF CONNECTING BARS, AND FUEL CELL STACK COMPRISING THE SAME

(71) Applicant: LG CHEM, LTD., Seoul (KR)

(72) Inventors: Hye Mi Jung, Daejeon (KR); Jae Choon Yang, Daejeon (KR); Jee Hoon Jeong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 194 days.

(21) Appl. No.: 15/741,864

(22) PCT Filed: Jul. 19, 2016

(86) PCT No.: PCT/KR2016/007820
§ 371 (c)(1),
(2) Date: Jan. 4, 2018

(87) PCT Pub. No.: WO2017/022978
PCT Pub. Date: Feb. 9, 2017

(65) Prior Publication Data
US 2018/0198153 A1    Jul. 12, 2018

(30) Foreign Application Priority Data

Jul. 31, 2015 (KR) .................. 10-2015-0108800

(51) Int. Cl.
*H01M 8/2465* (2016.01)
*H01M 8/1004* (2016.01)
(Continued)

(52) U.S. Cl.
CPC ......... *H01M 8/2465* (2013.01); *H01M 8/026* (2013.01); *H01M 8/0258* (2013.01);
(Continued)

(58) Field of Classification Search
CPC .. H01M 8/2465; H01M 8/026; H01M 8/0297; H01M 8/0263; H01M 8/0267;
(Continued)

(56) References Cited

U.S. PATENT DOCUMENTS

2002/0168562 A1    11/2002    Funatsu et al.
2012/0301810 A1    11/2012    Kawajiri et al.
(Continued)

FOREIGN PATENT DOCUMENTS

EP    2 618 413 A1    7/2013
EP    2 680 354 A1    1/2014
(Continued)

OTHER PUBLICATIONS

European Search Report for Appl. No. 16833214.6 dated May 9, 2018.

(Continued)

*Primary Examiner* — Raymond Alejandro
*Assistant Examiner* — Kwang Han
(74) *Attorney, Agent, or Firm* — Birch, Stewart, Kolasch & Birch, LLP

(57) ABSTRACT

The present invention relates to a separator and a fuel cell stack comprising the same, and according to one aspect of the present invention, there is provided a separator comprising: a plurality of riblet elements arranged to be spaced apart at a predetermined interval; and a plurality of connecting bars connecting two adjacent riblet elements, wherein each of the riblet elements comprises a contact portion having a predetermined area, and a first partition wall and a second partition wall each extended from both sides of the contact portion, the space formed by the first partition wall, the contact portion and the second partition wall is opened along the connection direction of the connecting bar, and at least (Continued)

two riblet elements are provided such that each of the contact portions has a different area.

21 Claims, 6 Drawing Sheets

(51) Int. Cl.
| | | |
|---|---|---|
| H01M 8/0263 | (2016.01) | |
| H01M 8/0297 | (2016.01) | |
| H01M 8/026 | (2016.01) | |
| H01M 8/0258 | (2016.01) | |
| H01M 8/0267 | (2016.01) | |
| H01M 8/1018 | (2016.01) | |

(52) U.S. Cl.
CPC ....... *H01M 8/0263* (2013.01); *H01M 8/0267* (2013.01); *H01M 8/0297* (2013.01); *H01M 8/1004* (2013.01); *H01M 8/1018* (2013.01)

(58) Field of Classification Search
CPC . H01M 8/0258; H01M 8/1004; H01M 8/1018
See application file for complete search history.

(56) References Cited

U.S. PATENT DOCUMENTS

| 2013/0177827 A1* | 7/2013 | Okabe | H01M 8/0258 |
| | | | 429/434 |
| 2016/0043412 A1* | 2/2016 | Hashimoto | H01M 8/1004 |
| | | | 429/482 |

FOREIGN PATENT DOCUMENTS

| JP | 2012-74266 A | 4/2012 |
| JP | 2012-199093 A | 10/2012 |
| JP | 2013-103231 A | 5/2013 |
| KR | 10-2013-0075941 A | 7/2013 |

OTHER PUBLICATIONS

International Search Report (PCT/ISA/210) issued in PCT/KR2016/007820, dated Oct. 12, 2016.

* cited by examiner

[Figure 1]
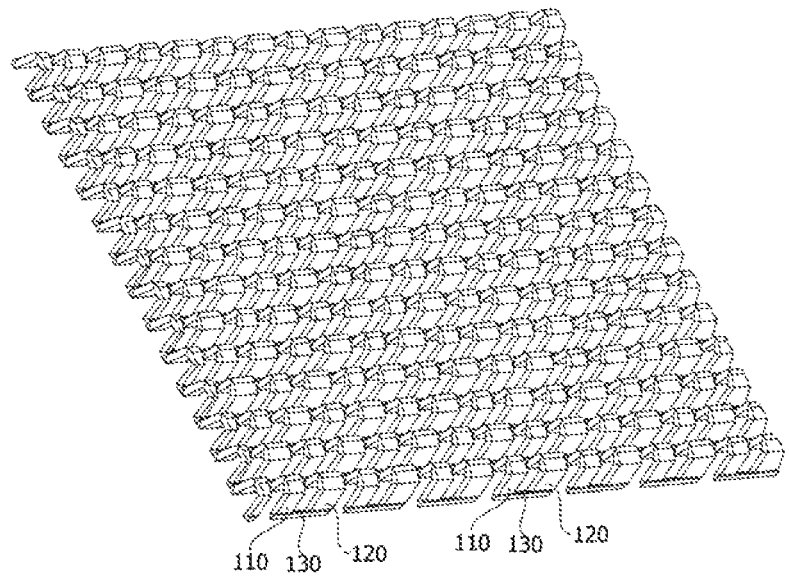

[Figure 2]
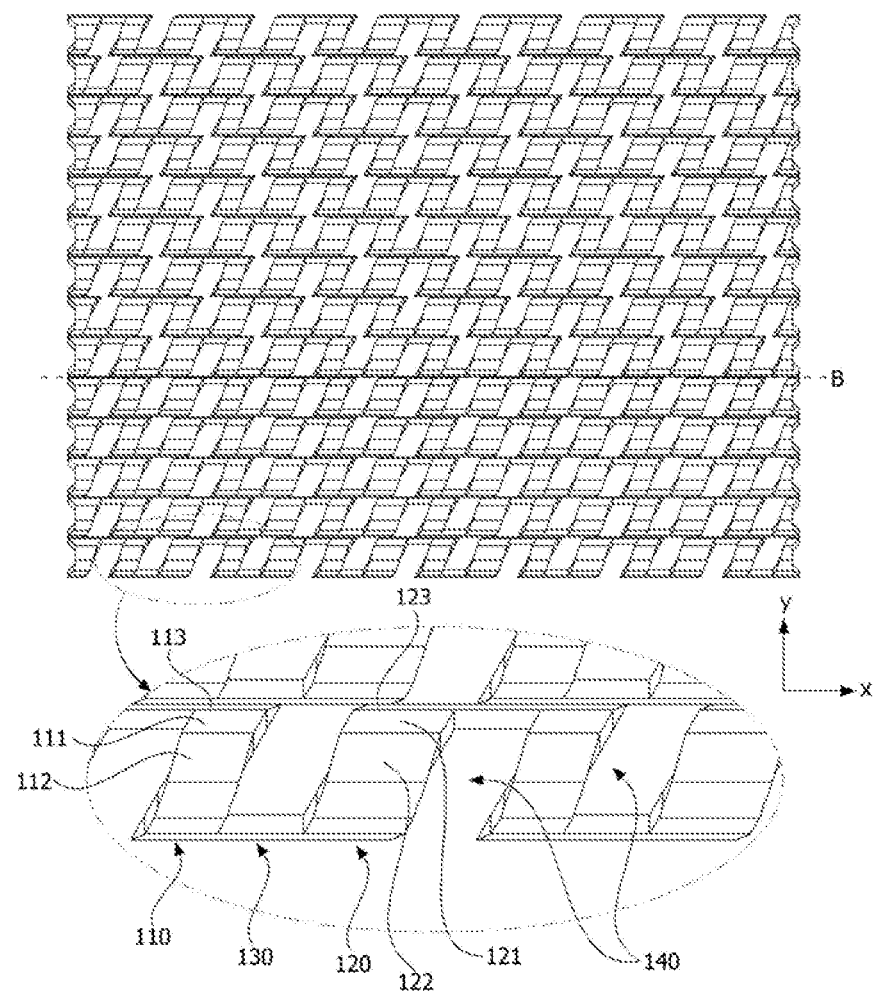

[Figure 3]
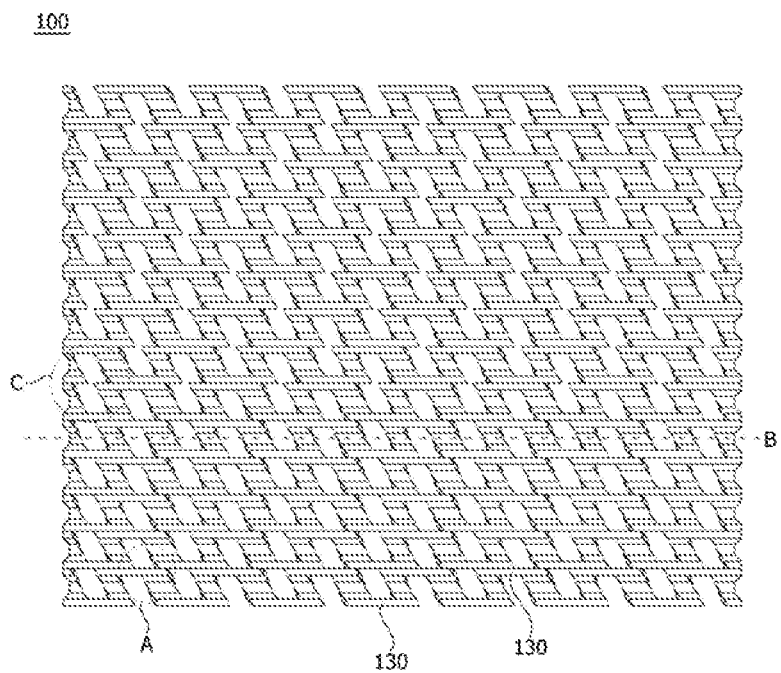

[Figure 4]
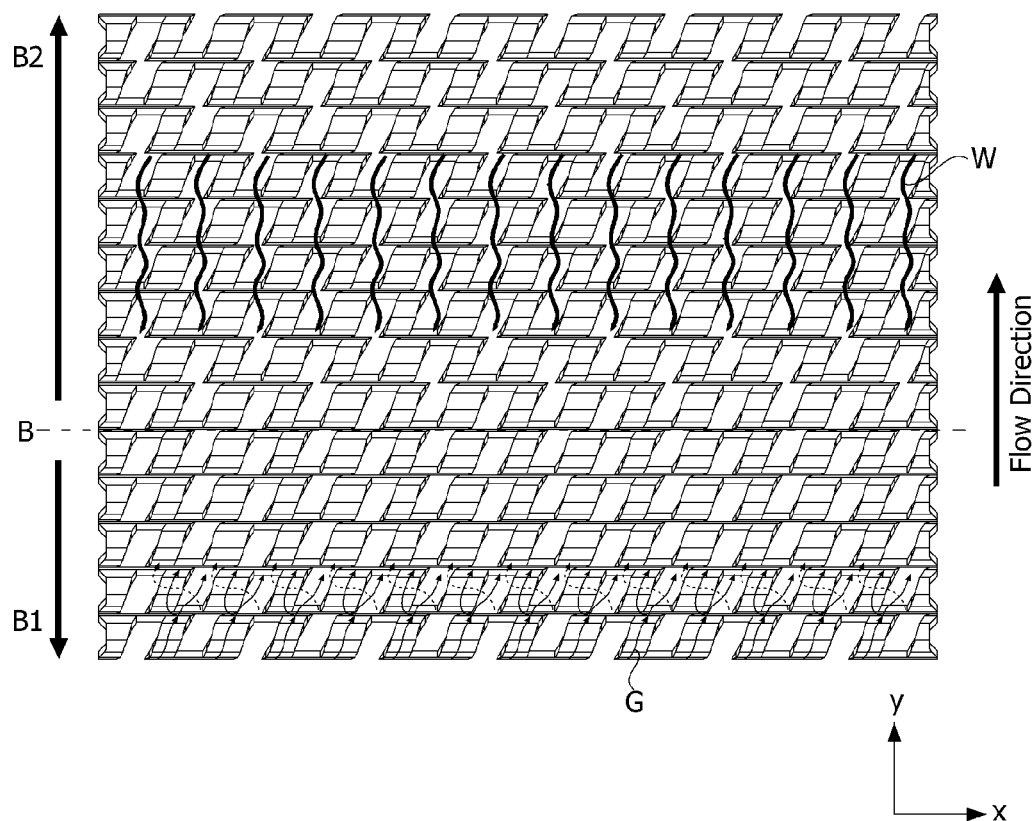

[Figure 5]
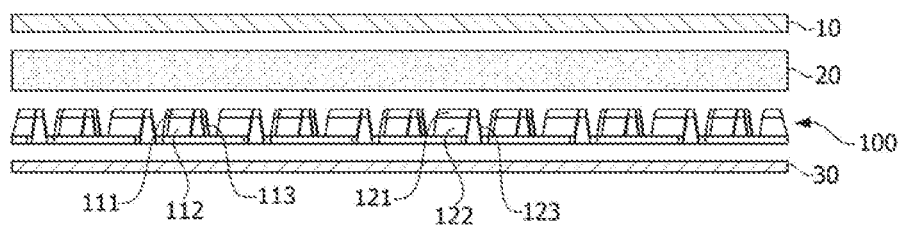
[Figure 6]
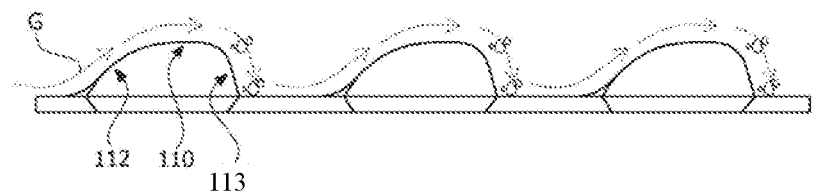
[Figure 7]
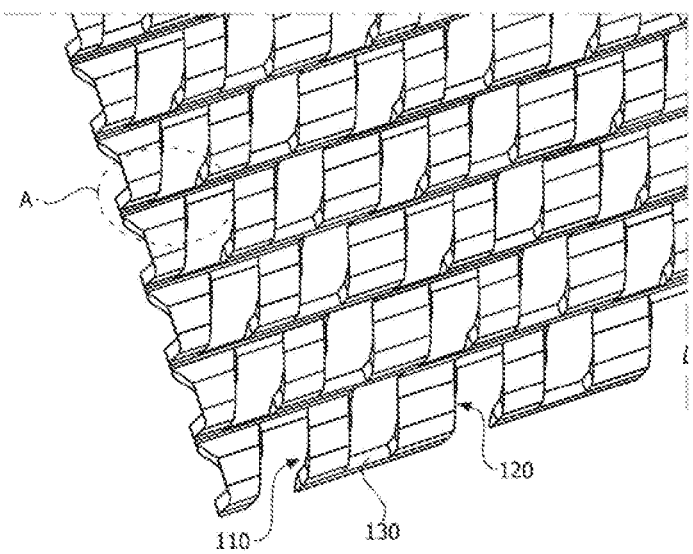

[Figure 8]
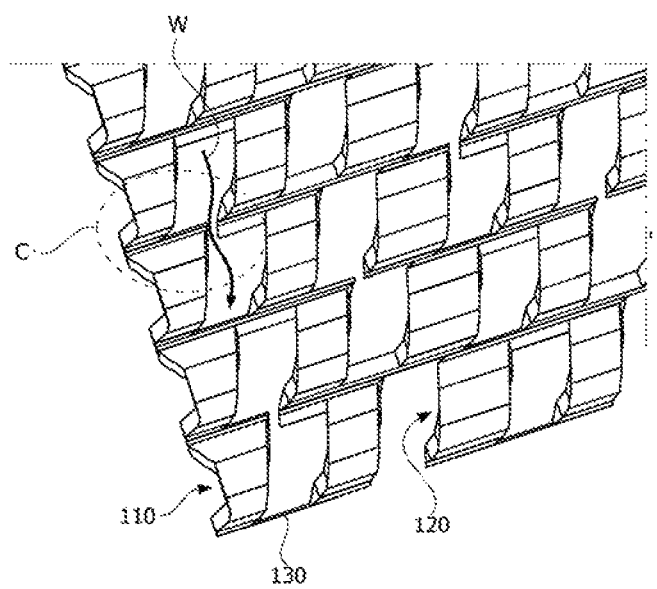

SEPARATOR HAVING A PLURALITY OF RIBLET ELEMENTS CONNECTED BY A PLURALITY OF CONNECTING BARS, AND FUEL CELL STACK COMPRISING THE SAME

TECHNICAL FIELD

The present invention relates to a separator and a fuel cell stack comprising the same.

The present application claims the benefit of priority based on Korean Patent Application No. 10-2015-0108800 filed on Jul. 31, 2015, the disclosure of which is incorporated herein by reference in its entirety.

BACKGROUND ART

Generally, a fuel cell is an energy conversion device that generates electrical energy through an electrochemical reaction between a fuel and an oxidizer and has an advantage that power can be consistently generated as long as the fuel is continuously supplied.

A polymer electrolyte membrane fuel cell (PEMFC), which uses a polymer membrane capable of permeating hydrogen ions as an electrolyte, has a low operating temperature of about 100° C. or lower as compared to other types of fuel cells, and has advantages of high energy conversion efficiency, high output density and fast response characteristics. Besides, since it can be miniaturized, it can be provided as portable, vehicle and household power supplies.

The polymer electrolyte fuel cell stack may comprise a membrane-electrode assembly (MEA) having an electrode layer formed by applying an anode and a cathode, respectively, around an electrolyte membrane composed of a polymer material, a gas diffusion layer (GDL) serving to distribute reaction gases evenly over reaction zones and to transfer electrons generated by oxidation reaction of the anode electrode toward the cathode electrode, a separating plate (bipolar plate) for supplying the reaction gases to the gas diffusion layer and discharging water generated by the electrochemical reaction to the outside, and a rubber material gasket having elasticity disposed on the outer circumference of the reaction zone of the separating plate or the membrane-electrode assembly to prevent leakage of the reaction gases and the cooling water.

Conventional separators for a fuel cell stack are configured such that the flows of the reaction gas and the resulting water travel in the same direction through two-dimensional channels or are distributed and discharged through intersecting three-dimensional solid shapes. However, they have a structure that is not suitable for efficiently discharging a variable amount of water under various operation conditions, thereby having a problem of deteriorating the performance of the fuel cell stack.

Particularly, there is a technical problem that a water transfer (supply/generation/discharge) imbalance in the fuel cell occurs in the high output region and a high mass transfer resistance (usually diffusion resistance) of the reaction gas in the reaction surface occurs.

In addition, in the case of conventional separating plates, for example, separating plates applied by metal mesh, expanded metal, etc., transfer passages of the reaction gas and the generated water are not distinguished clearly, thereby resulting in problems of reduction in the reaction gas supply efficiency and performance instability due to the condensed water occlusion in the microchannel.

DISCLOSURE

Technical Problem

It is a problem to be solved by the present invention to provide a separator capable of improving heat and mass transfer characteristics by turbulent flow and vortex formation, and a fuel cell stack comprising the same.

Also, it is a problem to be solved by the present invention to provide a separator capable of effectively discharging condensed water and a fuel cell stack comprising the same.

In addition, it is a problem to be solved by the present invention to provide a separator capable of improving reaction gas supply efficiency through efficient moisture management and preventing performance instability, and a fuel cell stack comprising the same.

Technical Solution

To solve the above-described problems, according to one aspect of the present invention, there is provided a separator comprising: a plurality of riblet elements arranged to be spaced apart at a predetermined interval; and a plurality of connecting bars connecting two adjacent riblet elements.

Here, each of the riblet elements comprises a contact portion having a predetermined area, and a first partition wall and a second partition wall each extended from both sides of the contact portion. In addition, the space formed by the first partition wall, the contact portion and the second partition wall is opened along the connection direction of the connecting bar. Furthermore, at least two riblet elements are provided such that each of the contact portions has a different area.

Also, according to another aspect of the present invention, there is provided a separator comprising: a plurality of riblet elements arranged to be spaced apart at a predetermined interval; and a plurality of connecting bars connecting two adjacent riblet elements.

Here, each of the riblet elements comprises a contact portion having a predetermined area, and a first partition wall and a second partition wall each extended from both sides of the contact portion. In addition, the space formed by the first partition wall, the contact portion and the second partition wall is opened along the connection direction of the connecting bar. Furthermore, the inclination of the first partition wall with respect to the contact portion and the inclination of the second partition wall with respect to the contact portion are set to be different from each other.

In addition, according to still another aspect of the present invention, there is provided a fuel cell stack comprising: a membrane-electrode assembly; a gas diffusion layer provided on one side of the membrane-electrode assembly; a separator comprising a plurality of riblet elements arranged to be spaced apart at a predetermined interval and each being in contact with the gas diffusion layer, and a plurality of connecting bars connecting two adjacent riblet elements; and a plate provided to surround the separator in contact with the plurality of connection bars.

Here, each of the riblet elements comprises a contact portion contacting the gas diffusion layer at a predetermined area, and a first partition wall and a second partition wall each extended from both sides of the contact portion toward the plate. At least two riblet elements are provided such that each contact portion has a different area.

Furthermore, according to still another aspect of the present invention, there is provided a fuel cell stack comprising: a membrane-electrode assembly; a gas diffusion layer provided on one side of the membrane-electrode assembly; a separator comprising a plurality of riblet elements arranged to be spaced apart at a predetermined interval and each being in contact with the gas diffusion layer, and a plurality of connecting bars connecting two adjacent riblet elements; and a plate provided to surround the separator in contact with the plurality of connection bars.

Here, each of the riblet elements comprises a contact portion contacting the gas diffusion layer, and a first partition wall and a second partition wall each extended from both sides of the contact portion toward the plate. In addition, the space formed by the first partition wall, the contact portion and the second partition wall is opened along the connection direction of the connecting bar. Furthermore, the inclination of the first partition wall with respect to the contact portion and the inclination of the second partition wall with respect to the contact portion are set to be different from each other.

Advantageous Effects

As described above, the separator related to one embodiment of the present invention and the fuel cell stack comprising the same have the following effects.

It is possible to improve heat and mass transfer characteristics by turbulent flow due to cross collision, and vortex formation.

It is possible to efficiently distribute the gas flow and the liquid (e.g., water) flow in the separator and to optimize the gas flow and the liquid (e.g., water) flow in the separator. In addition, it is possible to prevent accumulation of condensed water in the separator. Particularly, as the inclined surface is formed in the top part of the three-dimensional discontinuous riblet element adjacent to the gas diffusion layer/membrane-electrode assembly, the oxidant transfer by the turbulent mixed convection is promoted and the average flow velocity in the plane/thickness directions of the gas diffusion layer is increased, whereby the discharge of condensed water is improved.

Also, a discontinuous water transfer passage is formed in the first half section of the flow channel into which the reaction gas flows (about 30 to 40% or less of the total reaction gas flow length) for preventing a drying phenomenon due to excessive introduction of an oxidizing gas and a continuous water transfer passage is formed in the second half section of the flow channel for preventing flooding, so that an efficient moisture management can be allowed, and as a result, it is possible to efficiently manage moisture, to improve the reaction gas supply efficiency, and to prevent performance instability.

In addition, manufacturing costs and manufacturing time of the separator can be reduced through metal lath cutting, etching, micro-punching, stamping and the like.

BRIEF DESCRIPTION OF DRAWINGS

FIG. 1 is a perspective view of a separator related to one embodiment of the present invention.

FIG. 2 is a front view of the separator shown in FIG. 1.

FIG. 3 is a rear view of the separator shown in FIG. 1.

FIG. 4 is a front view for explaining flows of generated water and gas in the separator constituting a fuel cell stack.

FIG. 5 is a cross-sectional view of a fuel cell stack related to one embodiment of the present invention.

FIG. 6 is a conceptual diagram for explaining inclination angles of the first partition wall and the second partition wall of the riblet element.

FIGS. 7 and 8 are enlarged perspective views of parts A and C shown in FIG. 3, respectively.

MODE FOR INVENTION

Hereinafter, a separator according to one embodiment of the present invention and a fuel cell stack comprising the same will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

FIG. 1 is a perspective view of a separator (100) related to one embodiment of the present invention, FIG. 2 is a front view of the separator (100) shown in FIG. 1, and FIG. 3 is a rear view of the separator (100) shown in FIG. 1.

FIG. 4 is a front view for explaining flows of generated water and gas in the separator constituting a fuel cell stack, FIG. 5 is a cross-sectional view of a fuel cell stack (1) related to one embodiment of the present invention, and FIG. 6 is a conceptual diagram for explaining inclination angles of the first partition wall and the second partition wall of the riblet element.

In addition, FIGS. 7 and 8 are enlarged perspective views of parts A and C shown in FIG. 3, respectively.

A fuel cell stack (1) related to one embodiment of the present invention comprises a membrane-electrode assembly (10), and a gas diffusion layer (20) and a separator (100), provided on one side of the membrane-electrode assembly (10). Furthermore, the separator (100) is disposed so as to contact the gas diffusion layer (20) in some areas.

The structure of the separator (100) will be described with reference to the accompanying drawings.

The separator (100) comprises a plurality of riblet elements (110, 120) arranged to be spaced apart at a predetermined interval and a plurality of connecting bars (130) connecting two adjacent riblet elements (110, 120). The plurality of riblet elements (110, 120) are arranged to be spaced apart at a predetermined interval along a first direction (x-axis direction), and the plurality of riblet elements (110, 120) are arranged to be spaced apart at a predetermined interval along a second direction (y-axis direction) orthogonal to the first direction (x-axis direction). The plurality of riblet elements (110, 120) are in contact with the gas diffusion layer (20), respectively.

Here, each of the riblet elements (110, 120) comprises a contact portion (111, 121) having a predetermined area, and a first partition wall (112, 122) and a second partition wall (113, 123) each extended from both sides of the contact portion. At this time, at least two riblet elements (110, 120) are provided such that each of the contact portions (111, 121) has a different area. Through such a structure, performance loss due to contact resistance can be prevented, and for example, the contact area can be secured in a level of 20 to 40% of the reaction zone.

Specifically, the plurality of riblet elements comprises a plurality of first riblet elements (110) and a plurality of second riblet elements (120). The first and second riblet elements (110, 120) have the same structure, but differ only in the areas of the contact portions (111, 121). For example, the area of the contact portion (111) in the first riblet element (110) is smaller than the area of the contact portion (121) in the second riblet element (120).

Also, the first riblet elements (110) and the second riblet elements (120) are connected through connecting bars (130). The connecting bars (130) may be provided to connect two adjacent first partition walls (112, 122) or two adjacent second partition walls (113, 123).

For example, the first riblet element (110) and the second riblet element (120) may also be connected by connecting the first partition walls (112, 122) by the connecting bar (130) and the first riblet element (110) and the second riblet element (120) may also be connected by connecting the second partition walls (113, 123) by the connecting bar (130).

In addition, the first partition wall (112) and the second partition wall (113) may be each formed to have different inclination angles with respect to the connecting bar (130) from each other. Furthermore, the first partition wall (112) and the second partition wall (113) may be each formed to have different inclination angles with respect to the contact portion (111) from each other. Particularly, the inclination of the first partition wall (112) with respect to the contact portion (111) and the inclination of the second partition wall (113) with respect to the contact portion (111) are set to be different from each other. Such a feature relates to heat and mass transfer characteristics, as shown in FIG. 6, and will be described below along with flow of the fuel or the reaction gas (hereinafter, also referred to as 'gas').

Meanwhile, the space formed by the first partition wall (112), the contact portion (111) and the second partition wall (113) is opened along the connection direction of the connecting bar (130). Also, a first space portion (140) through which gas or water can flow is formed between two adjacent riblet elements (110, 120).

Hereinafter, the arrangement of the riblet elements (110, 120) will be described in detail.

The plurality of riblet elements (110, 120) may be arranged coaxially along the first direction (x-axis direction). Also, the plurality of riblet elements (110, 120) may be arranged along the first direction such that the contact portions (111, 121) have different areas from each other alternately. For example, the first riblet elements (110) and the second riblet elements (120) may be alternately arranged along the first direction. Referring to FIGS. 4 and 5, riblet elements (for example, 110) may be arranged along the second direction (y-axis direction) orthogonal to the first direction (x-axis direction) such that the centers of the first partition wall (112) and the second partition wall (112) do not coincide with each other. In addition, the plurality of riblet elements (110, 120) may be arranged along the second direction (y-axis direction) orthogonal to the first direction such that the contact portions have different areas from each other alternately.

Furthermore, referring to FIG. 7, the plurality of connecting bars (130) connect riblet elements (110, 120) adjacent along the first direction, where adjacent connecting bars (130) may be all connected continuously along the first direction (see part A).

Alternatively, referring to FIG. 8, the plurality of connecting bars (130) connect riblet elements (110, 120) adjacent along the first direction, where some adjacent connecting bars (130) may be connected intermittently along the first direction (see part C).

Besides, the fuel cell stack (1) comprises a plate (30) provided to surround the separator (100) in contact with the plurality of connecting bars (130). The flows of gas and water can be separated through the separator (100), and in particular, the water (generated water) can flow through the gap between the connecting bars (130) and the surface of the plate (30). For example, referring to FIG. 4, the flow direction of the gas (G) and the flow direction of the generated water (W) may be opposite to each other.

Referring to FIG. 4, the plurality of riblet elements (110, 120) may be arranged coaxially along the first direction. Also, each of the riblet elements (110, 120) may be arranged along the second direction orthogonal to the first direction such that the centers of the first partition wall (112) and the second partition wall (113) do not coincide with each other. In addition, the reaction gas (G) may be supplied to the side of the first partition wall (112) so as to flow along the second direction.

In this structure, the oxidizing gas transfer in the reaction electrode plane and the discharge of the generated water by the electrochemical reaction may be promoted by oxidizing gas (G) mixed collision crossover flows and turbulent mixed convection flows of the oxidizing gas along the inclined surface of the riblet element (for example, first partition wall). In particular, it is possible to induce an air-cooling effect in the reaction plane by the mixed diffusion-convection flows inside the gas diffusion layer (20) and the membrane-electrode assembly (10). Thus, concentration of local thermal loads in the reaction plane can be prevented.

The separator (100) may be divided into the first half flow channel (B1) and the second half flow channel (B2) through which the reaction gas (G) flows at a specific position (B) along the second direction (y-axis direction or flow direction). Here, the second half flow channel (B2) may be provided so that the generated water (W) can flow continuously through the space (see part C in FIG. 8) between the connecting bars (130) in the direction opposite to the flow direction of the reaction gas. To this end, in the second half flow channel (B2), some adjacent connecting bars (130) may be connected intermittently along the first direction so as to provide the flow passage of the generated water (W).

Alternatively, in the first half flow channel (B1), the adjacent connecting bars (130) may be all connected continuously along the first direction (see part A in FIG. 7). Also, the length of the second half flow channel (B2) along the second direction may be formed to be longer than the length of the first half flow channel (B1) along the second direction.

On the other hand, in the first half flow channel (B1), the contact portions of the plurality of riblet elements may be arranged along the second direction to have the same area. For example, the plurality of first riblet elements may be arranged in order. Alternatively, in the second half flow channel (B2), the plurality of riblet elements may be arranged along the second direction such that the contact portions have different areas from each other alternately. Thus, the first half flow channel and the second half flow channel can be adjusted to have different flow characteristics from each other through the arrangement of the riblet elements.

In summary, the sections of the micro-formed flow channels in the separator (100) can be separated to maintain the water balance in the electrolyte membrane by the cross-water transfer between anode/cathode. Particularly, in the first half flow channel section (B1), discontinuous water transfer passages may be disposed to increase a residence time of the condensed water flowing into the lower end by its own weight. Therefore, there are effects capable of promoting reverse diffusion of water from the cathode inlet side to the anode outlet side and preventing drying of the membrane-electrode assembly at the cathode inlet side due to excessive oxidizing gas inflow. Furthermore, in the second half flow channel section (B2), the flooding at the cathode outlet side can be prevented by disposing continuous water transfer passages and reducing the mass transfer resistance of the water delivery path.

On the other hand, the inclination of the first partition wall (112) with respect to the contact portion (for example, 111) and the inclination of the second partition wall (113) with respect to the contact portion are set to be different from each other. As described above, the reaction gas (G) is provided to be supplied to the side of the first partition wall (112). Referring to FIGS. 4 and 6, the first partition wall (112) is inclined so that a velocity component toward the gas diffusion layer (20) can be imparted to the flow of the reaction gas (G). In addition, the first partition wall (112) may be provided to have a slope slower than that of the second partition wall (113).

The separator (100) may be manufactured by various methods, and for example, may be manufactured through a sheet metal material and a stamping process.

The preferred embodiments of the present invention as described above are disclosed for illustrative purposes, which can be modified, changed and added within thought and scope of the present invention by those skilled in the art and it will be considered that such modification, change and addition fall within the following claims.

INDUSTRIAL APPLICABILITY

The separator related to one embodiment of the present invention and the fuel cell stack comprising the same can improve heat and mass transfer characteristics by the turbulent flow due to the cross collision, and the vortex formation.

The invention claimed is:

1. A separator comprising:
a plurality of riblet elements arranged to be spaced apart at a predetermined interval; and
a plurality of connecting bars connecting two adjacent riblet elements at opposite ends of each riblet element,
wherein each of the riblet elements comprises a contact portion for contacting a gas diffusion layer, the contact portion having a predetermined area, and a first partition wall and a second partition wall each extended from both sides of said contact portion,
wherein the space formed by the first partition wall, the contact portion and the second partition wall is opened along the connection direction of the connecting bar, and
wherein at least two riblet elements are provided such that each of the contact portions has a different area,
wherein the plurality of connecting bars connect riblet elements adjacent along a first direction, and
wherein some adjacent connecting bars are connected intermittently along a first continuous line in the first direction.

2. The separator according to claim 1,
wherein the connecting bar is provided so as to connect two adjacent first partition walls or two adjacent second partition walls.

3. The separator according to claim 1,
wherein the first partition wall and the second partition wall are each formed to have different inclination angles with respect to the connecting bar from each other.

4. The separator according to claim 1,
wherein the plurality of riblet elements are arranged coaxially along the first direction.

5. The separator according to claim 4,
wherein the riblet elements are arranged along a second direction orthogonal to the first direction so that the centers of the first partition wall and the second partition wall of each riblet element do not coincide with each other.

6. The separator according to claim 4,
wherein the plurality of riblet elements are arranged along the first direction so that the contact portions have different areas from each other alternately.

7. The separator according to claim 6,
wherein the plurality of riblet elements are arranged along a second direction orthogonal to the first direction so that the contact portions have different areas from each other alternately.

8. The separator according to claim 1,
wherein some adjacent connecting bars are all connected continuously along a second line in the first direction.

9. A fuel cell stack comprising:
a membrane-electrode assembly;
a gas diffusion layer provided on one side of the membrane-electrode assembly;
the separator according to claim 1, each riblet element of the separator being in contact with the gas diffusion layer; and
a plate provided to surround the separator in contact with the plurality of connection bars,
wherein the first partition wall and the second partition wall of each riblet element is extended from both sides of the contact portion toward the plate.

10. The fuel cell stack according to claim 9,
wherein the connecting bar is provided so as to connect two adjacent first partition walls or two adjacent second partition walls along the first direction.

11. The fuel cell stack according to claim 10,
wherein the plurality of riblet elements are arranged coaxially along the first direction,
each of the riblet elements is arranged along a second direction orthogonal to the first direction so that the centers of the first partition wall and the second partition wall do not coincide with each other, and
a reaction gas is supplied to the first partition wall side to flow along said second direction.

12. The fuel cell stack according to claim 11,
wherein said separator is divided into a first half flow channel and a second half flow channel through which the reaction gas flows at a specific position along the second direction, and
the second half flow channel is provided so that the generated water can flow continuously in the direction opposite to the flow direction of the reaction gas through the space between the connecting bars.

13. The fuel cell stack according to claim 12,
wherein in the second half flow channel, some adjacent connecting bars are connected intermittently along the first direction so as to provide a flow passage of the generated water.

14. The fuel cell stack according to claim 12,
wherein in the first half flow channel, adjacent connecting bars are all connected continuously along the first direction.

15. The fuel cell stack according to claim 12,
wherein the length of the second half flow channel along the second direction is formed to be longer than the length of the first half flow channel along the second direction.

16. The fuel cell stack according to claim 12,
wherein in the first half flow channel, the contact portions of the plurality of riblet elements are arranged along the second direction to have the same area.

17. The fuel cell stack according to claim 12,
wherein in the second half flow channel, the plurality of riblet elements are arranged along the second direction so that the contact portions have different areas from each other alternately.

18. A fuel cell stack comprising:
a membrane-electrode assembly;
a gas diffusion layer provided on one side of the membrane-electrode assembly;
the separator according to claim 1, each riblet element of the separator being in contact with the gas diffusion layer; and
a plate provided to surround the separator in contact with the plurality of connection bars,
wherein the first partition wall and the second partition wall of each riblet element is extended from both sides of said contact portion toward the plate, and
wherein the inclination of the first partition wall with respect to the contact portion and the inclination of the second partition wall with respect to the contact portion are set to be different from each other.

19. The fuel cell stack according to claim 18,
wherein a reaction gas is provided to be supplied to the first partition wall side.

20. The fuel cell stack according to claim 19,
wherein the first partition wall is inclined so that a velocity component toward the gas diffusion layer can be imparted to the flow of the reaction gas.

21. The fuel cell stack according to claim 19, wherein the first partition wall has an inclination angle less than that of the second partition wall.

* * * * *